United States Patent [19]
Kelley et al.

[11] Patent Number: 6,035,355
[45] Date of Patent: Mar. 7, 2000

[54] PCI SYSTEM AND ADAPTER REQUIREMENTS FOLLOWING RESET

[75] Inventors: Richard Allen Kelley, Apex, N.C.; Danny Marvin Neal, Round Rock; Steven Mark Thurber, Austin, both of Tex.

[73] Assignee: International Business Machines Corporation, Armonk, N.Y.

[21] Appl. No.: 09/067,042

[22] Filed: Apr. 27, 1998

[51] Int. Cl.[7] .................................................. G06F 13/00
[52] U.S. Cl. ................................ 710/101; 710/2; 710/10; 710/104; 710/129
[58] Field of Search .............................. 710/1–4, 10–15, 710/62–64, 72–74, 129–130, 100–105; 235/486

[56] References Cited

U.S. PATENT DOCUMENTS

| | | | |
|---|---|---|---|
| 4,426,679 | 1/1984 | Yu et al. | 364/200 |
| 5,517,646 | 5/1996 | Piccirillo et al. | 713/1 |
| 5,533,204 | 7/1996 | Tipley | 395/288 |
| 5,537,664 | 7/1996 | Rowland et al. | 395/879 |
| 5,548,712 | 8/1996 | Larson et al. | 395/182.05 |
| 5,548,782 | 8/1996 | Michael et al. | 395/835 |
| 5,581,708 | 12/1996 | Iijima | 710/11 |
| 5,594,873 | 1/1997 | Garrett | 395/281 |
| 5,712,472 | 1/1998 | Lee | 235/486 |
| 5,768,542 | 6/1998 | Enstrom et al. | 710/104 |
| 5,784,576 | 7/1998 | Guthrie et al. | 710/103 |
| 5,815,647 | 9/1998 | Buckland et al. | 714/3 |
| 5,845,114 | 12/1998 | Cloud | 710/260 |
| 5,875,310 | 2/1999 | Buckland et al. | 710/126 |
| 5,887,144 | 3/1999 | Guthrie et al. | 710/101 |
| 5,898,869 | 4/1999 | Anderson | 713/2 |
| 5,922,060 | 7/1999 | Goodrum | 710/103 |
| 5,933,609 | 8/1999 | Walker et al. | 710/104 |

OTHER PUBLICATIONS

IBM Technical Disclosure Bulletin, "Control Circuit for Hot Plugging a ROS Cartridge," vol. 29, No. 3, Aug. 1986.

*Primary Examiner*—Christopher B. Shin
*Attorney, Agent, or Firm*—Volel Emile; Jack V. Musgrove; Andrew J. Dillon

[57] ABSTRACT

A method of registering a newly added peripheral device with a computer system by responding with a status message from the device to a bus of the computer system, in response to an access attempt, and within a predetermined time period from the deasserting of the reset signal applied to device, so as to avoid stalling and thereby avoid the need to reboot the system in order to initialize the new peripheral device with the operating system. The device may be allowed to initially send a retry response, provided the response occurs during an initial latency period which is less than the predetermined time period. The invention also enables the peripheral device to respond to non-configuration cycles immediately following configuration completion. Internal logic of the peripheral device can be initialized after responding with the status message. Non-configuration access to the peripheral device can be prevented until it is ready to respond, by setting a bit (in the configuration space of the peripheral device to indicate that the peripheral device is ready.

19 Claims, 2 Drawing Sheets

PCI SYSTEM AND ADAPTER REQUIREMENTS FOLLOWING RESET

BACKGROUND OF THE INVENTION

1. Field of the Invention

The present invention generally relates to computer systems, and more specifically to a method of configuring a computer system having peripheral devices, particularly adapter devices (such as graphics adapters or network adapters) which require configuration after a system reset, and which are interconnected to the system's processor using a peripheral (local) bus.

2. Description of Related Art

A typical structure for a conventional computer system includes one or more processing units connected to a system memory device (random access memory or RAM) and to various peripheral, or input/output (I/O), devices such as a display monitor, a keyboard, a graphical pointer (mouse), and a permanent storage device (hard disk). The system memory device is used by a processing unit in carrying out program instructions, and stores those instructions as well as data values that are fed to or generated by the programs. A processing unit communicates with the other components by various means, including one or more interconnects (buses), or direct memory-access channels. A computer system may have many additional components, such as serial and parallel ports for connection to, e.g., printers, and network adapters. Other components might further be used in conjunction with the foregoing; for example, a display adapter might be used to control a video display monitor, a memory controller can be used to access the system memory, etc.

Several different bus designs have been developed for interconnecting the various computer components. The original personal computer (PCs) introduced by International Business Machines Corp. (IBM—assignee of the present invention) used an "expansion" bus referred to as the XT bus, which allowed a user to add various optional devices, such as additional memory (RAM), sound cards, telephone modems, etc. This early design was improved upon by adding more data and address lines, new interrupt lines, and direct memory-access (DMA) control lines, to create the well-known AT bus, which is also referred to as the Industry Standard Architecture (ISA) bus. The AT design allowed the microprocessor to run at a faster speed than the expansion bus. A 32-bit extension to this bus was later created, which is referred to as the Extended Industry Standard Architecture (EISA). Another 32-bit expansion bus developed by IBM is the Microchannel Architecture (MCA) bus.

In addition to the foregoing designs, several other bus designs have been developed allowing the use of a system bus which interconnects the processor and the system memory device(s), along with a separate, local bus which interconnects the peripheral devices to the system bus (using a bus bridge). Two well-known standards are the Video Electronics Standards Association (VL) bus, and the Peripheral Component Interconnect (PCI) bus.

The PCI specification allows up to four PCI-compliant expansion cards to be installed in "slots" constructed along the PCI bus (up to 10 loads can be placed on the bus, but each device requires two loads as a connector for a slot constitutes a load, so four devices can be added at most (8 loads), since the bridge also counts as a load). A PCI local bus system uses a PCI controller, which must be installed in one of the PCI-compliant slots. An expansion bus controller for a system's ISA, EISA, or MCA slots can optionally be installed as well, providing increased synchronization for all of the system's bus-installed resources. A PCI controller exchanges data with the microprocessor either 32 bits or 64 bits at a time, depending on the implementation, and allows certain "intelligent" PCI-compliant adapters to perform tasks concurrently with the microprocessor, using a technique called bus mastering. The PCI specification also allows for multiplexing, a technique that permits more than one electrical signal to be present on the bus at one time.

A typical PCI system 10 is illustrated in FIG. 1. System 10 includes a central processing unit (CPU) 12, firmware or read-only memory (ROM) 14, and a dynamic random access memory (DRAM) 16 which are all connected to a system bus 18. CPU 12, ROM 14 and DRAM 16 are also coupled to a PCI local bus 20 using a PCI host bridge 22. PCI host bridge 22 provides a low latency path through which processor 12 may access PCI devices mapped anywhere within bus memory or I/O address spaces. PCI host bridge 22 also provides a high bandwidth path to allow the PCI devices to access DRAM 16.

Attached to PCI local bus 20 are a local area network (LAN) adapter 24, a small computer system interface (SCSI) adapter 26, an expansion bus bridge 28, an audio adapter 30, and a graphics adapter 32. Lan adapter 24 is used to connect computer system 10 to an external computer network 34. SCSI adapter 26 is used to control high-speed SCSI disk drive 36. Expansion bus bridge 28 is used to couple an ISA expansion bus 38 to PCI local bus 20. As shown, several user input devices are connected to ISA bus 38, including a keyboard 40, a microphone 42, and a graphical pointing device (mouse) 44. Other devices may also be attached to ISA bus 38, such as a CD-ROM drive 46. Audio adapter 30 controls audio output to a speaker 48, and graphics adapter 32 controls visual output to a display monitor 50.

In earlier computer systems, all of the peripheral components had to be connected (inserted in the PCI or ISA slots) at the time that the computer was first turned on, in order to properly register (initialize) the devices with the computer's operating system. These devices are checked during the system's power-on self test (POST), which includes a set of routines stored in ROM 14 (also referred to as read-only storage, or ROS) that test the peripherals to see if they are properly connected and operating. If problems with any of the devices are detected, these routines alert the user by sounding a series of beeps or displaying a message, often accompanied by a diagnostic numeric value, to the standard output device or standard error device (usually the display screen).

In the earlier systems, if a device were simply not present during the POST, then it would not be recognized when it was later inserted in a slot (while the computer was still running). Instead, those systems were required to be "rebooted" in order to be able to communicate with and utilize the later-added devices. "Rebooting" refers to the restarting of a computer system by reloading its most basic program instructions, viz., the operating system. A system can be rebooted using the software itself (a warm boot) or by actuating the system's hardware, i.e., the reset or power buttons (a cold boot). After rebooting, the new device can be identified using various techniques. See, e.g., U.S. Pat. No. 5,594,873.

More recent computer systems have the ability to recognize devices which are added to a bus while the computer is operating, that is, without having to reboot the system. One example is the "plug and play" specification, which allows a PC to configure itself automatically to work with peripherals. A user can "plug" in a peripheral and "play" it without manually configuring the system. Plug and play operation requires both ROM that supports the specification, and a special expansion card. While this approach allows the system to recognize a newly added device, it is still often necessary to reset the system in order to properly initialize the device with the operating system. A further improvement in this area is the "hot-plug" specification, wherein separate reset lines are provided for each peripheral device, such that a device can be initialized with the operating system without requiring the entire system to be rebooted (this ability of the device/system is referred to as "hot-pluggable").

One problem that persists in the initialization of peripheral devices is that, following a deactivation of the reset signal (RST#), there may be a long time before an adapter is prepared to respond to configuration cycles with even a RETRY response (which is used to indicate that the adapter is functioning, but it is currently too busy to respond to the initialization). As a result, following deactivation of RST#, a system may consider an adapter as not present or defective if it does not respond. If the device responds to configuration or regular (non-configuration) cycles with RETRY, the PCI bus and/or the system processor can stall, resulting in the requirement to reboot the system.

Previously, this problem has not been significant, but now there are a number of situations that may result in an adapter card and/or a group of adapters being reset while the processor and the rest of the I/O subsystem remains operational. One factor that contributes to this problem is the increased complexity of adapters, such as an adapter that must initialize a programmable logic array (PLA) following RST# deactivation before it can handle a configuration cycle or even respond with RETRY, or an adapter with an on-board processor that must load registers and complete other initialization steps before it can handle a configuration cycle or even respond with RETRY. Another factor is the provision of separate reset lines to the adapters, such as is provided in the hot-plug specification and similar PCI power management specifications, or in diagnostic analysis of an individual card while the rest of the system and PCI I/O subsystem remains operational.

In light of the foregoing, it would be desirable to devise a method of avoiding rebooting requirements associated with delayed initialization responses from peripheral devices. It would be further advantageous if, following configuration completion, the adapter were prepared to respond to normal (non-configuration) cycles without a RETRY response.

SUMMARY OF THE INVENTION

It is therefore one object of the present invention to provide an improved computer system having an expansion bus which allows the addition of peripheral devices to the system.

It is another object of the present invention to provide such a computer system wherein a reset signal can be applied to a peripheral device to allow initialization of the device with the computer's operating system, without requiring the entire system to be rebooted.

It is yet another object of the present invention to provide such a computer system which reduces delays in initialization responses from peripheral devices, to avoid initialization failures.

The foregoing objects are achieved in a method of registering a peripheral device with a computer, generally comprising the steps of isolating a slot from a bus of the computer, inserting the peripheral device into the slot, connecting the slot to the bus, deasserting a reset signal on the slot, responding with a status message from the peripheral device to the bus in response to an access attempt within a predetermined time period established by the computer, and initializing the peripheral device with an operating system of the computer in response to the responding step. If the status message is a retry response, the responding step occurs during an initial latency period which is less than the predetermined time period. The invention can also enable the peripheral device to respond to non-configuration cycles immediately following configuration completion. Internal logic of the peripheral device can be initialized after the responding step; in other words, part of the internal initialization can be moved to other operations, such as a diagnostic operation.

The invention also contemplates the use of device driver to peripheral device communications via the configuration space of the peripheral device, to prevent non-configuration access to the peripheral device until the peripheral device is ready to respond to such non-configuration access. This feature may be implemented by setting a bit (in the configuration space of the peripheral device.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
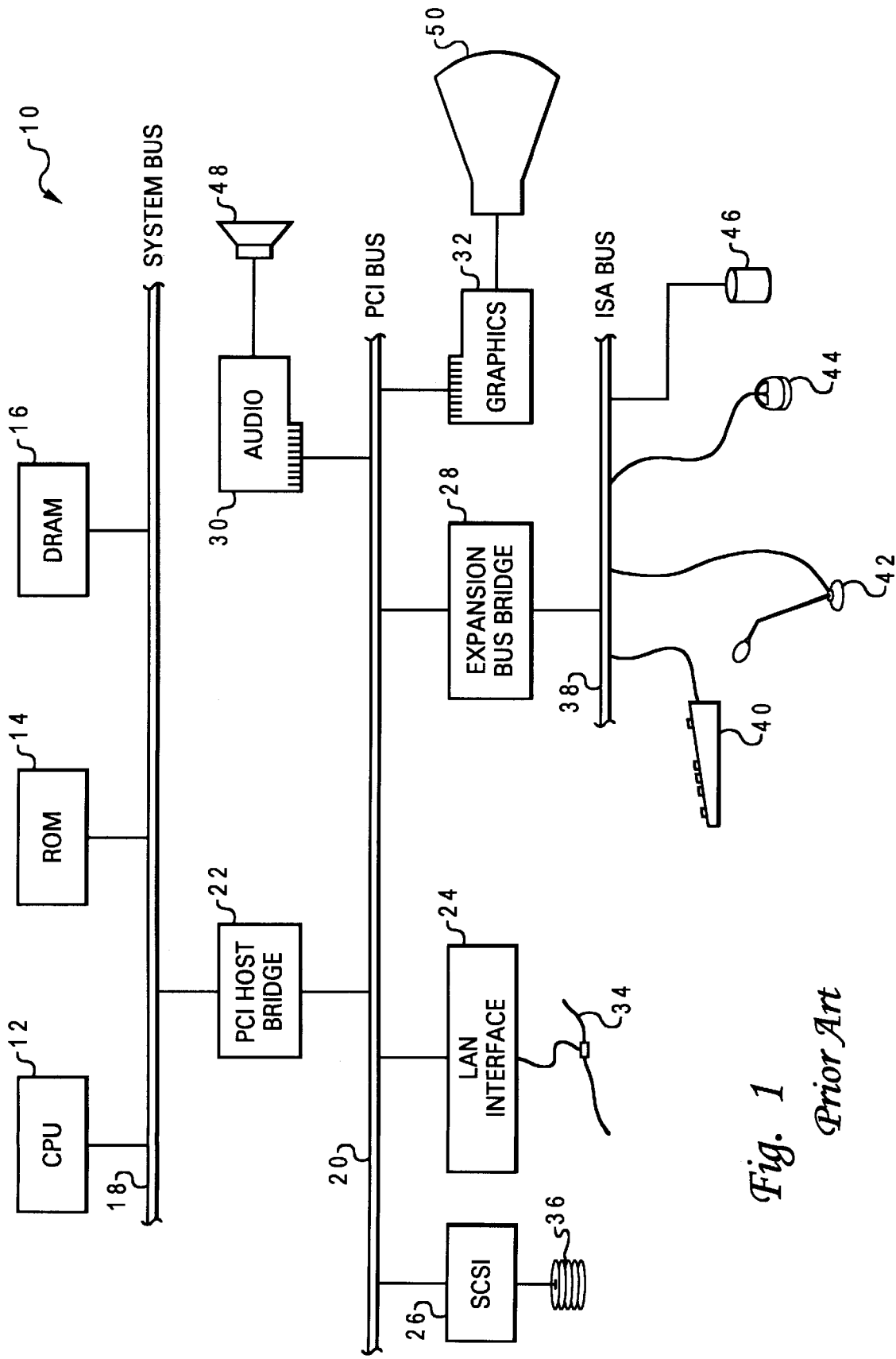
FIG. 1 is a block diagram of a conventional computer system having a Peripheral Component Interconnect (PCI) bus which allows peripheral devices to be added to the computer system.
Figure 2:
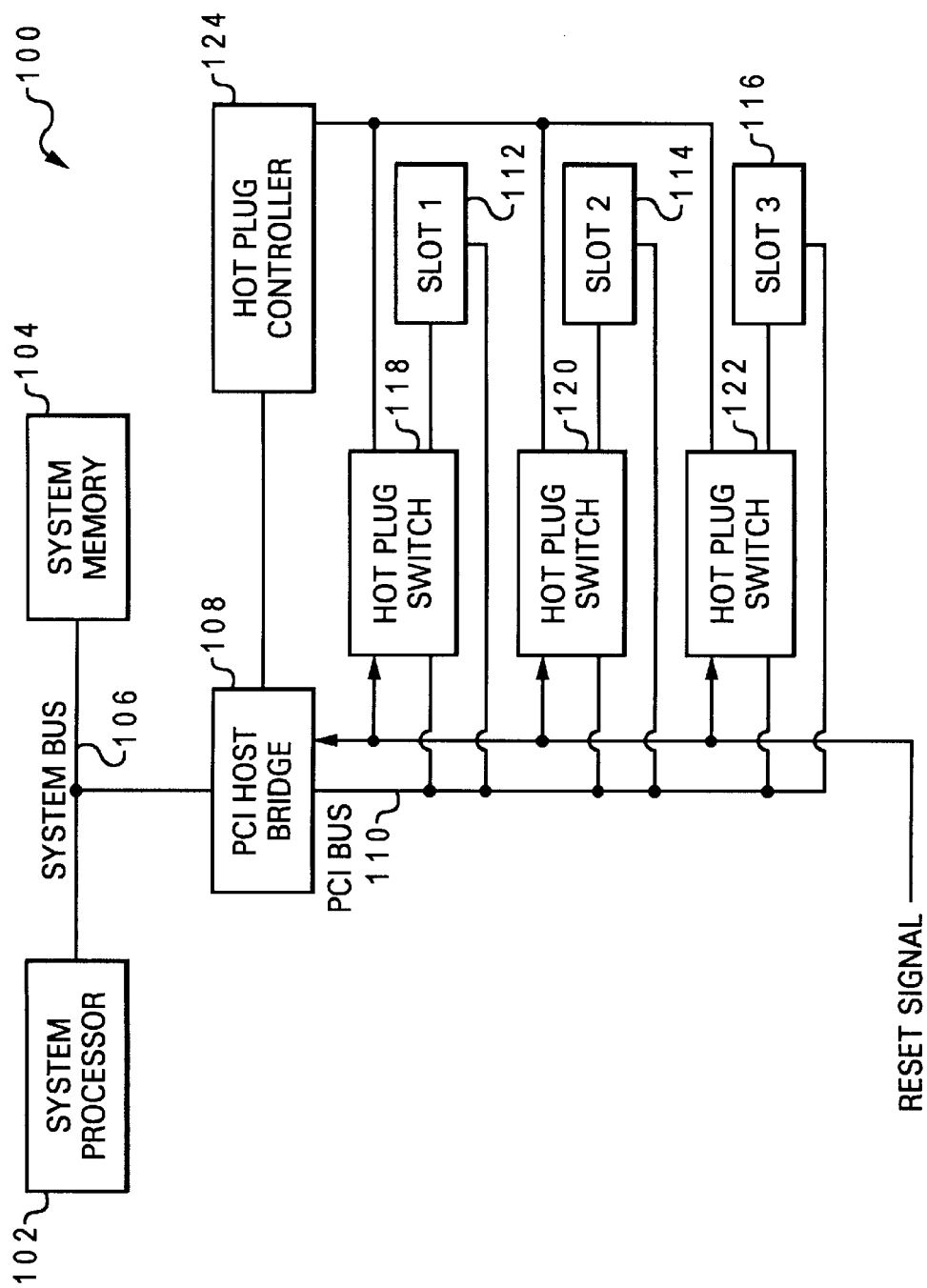
FIG. 2 is a block diagram of one embodiment of a computer system constructed in accordance with the present invention, having a PCI bus with a plurality of slots for receiving peripheral devices, and a "hot-plug" controller used to initialize the devices while the remainder of the system is still running.

With reference now to the figures, and in particular with reference to FIG. 2, there is depicted one embodiment of a computer system 100 constructed in accordance with the present invention. System 100 includes a CPU or processor 102 connected to a system memory device 104 using a system bus 106. A Peripheral Component Interconnect (PCI) host bridge 108 is used to couple a PCI local bus 110 to system bus 106. Various peripheral devices may be removably connected to the system using a plurality of slots, three of which 112, 114 and 116 are shown. Each slot is connected to PCI bus 110 using respective hot-plug switches 118, 120 and 122, which can be used to isolate all the signals on a slot from bus 110 while the rest of the platform is running. Switches 118, 120 and 122 also remove all power from a slot while the remainder of the platform is still fully powered. A hot-plug controller 124 is also connected to PCI host bridge 108 and each of the hot-plug switches 118, 120 and 122.

In the depicted embodiment, computer system 100 is compliant with the hot-pluggable design set forth in the document "PCI Hot-Plug Specification," revision 1.0, published by Intel Corp. (Oct. 6, 1997), which is hereby incorporated. As such, slots 112, 114 and 116 are designed for adapter cards that are 32-bits or 64-bits wide, operate at 33 MHz or 66 MHz, and use 3.3 volt or 5 volt signaling (the adapter cards have novel constructions as described further below). An adapter card could contain a single PCI device or multiple devices behind a PCI-to-PCI bridge. Each slot has a logical slot identifier that uniquely identifies a particular slot.

Hot-plug controller 124 controls the electrical aspects of powering up and down a PCI slot. More than one hot-plug controller can be used. A software driver (hot-plug system driver) is used to control and monitor hot-plug controller 124. If there is more than one hot-plug controller, then more than one hot-plug system driver can be used. Higher-level software (a hot-plug "service") has overall control of the hot-plug operations. This service includes a user interface, and can issue requests to the operating system to quiesce adapter activity, and further issue requests (primitives) to the hot-plug system driver to turn the slots on or off, using switches 118, 120 and 122.

An adapter placed in one of the slots 112, 114 and 116 can be initialized with the operating system of computer system 100 without requiring rebooting of the entire system. A slot is powered down and isolated from PCI bus 110 prior to inserting an adapter card, using hot-plug controller 124. After inserting the card, the user notifies the hot-plug service, which turns on the slot containing the new adapter, by issuing a primitive to the hot-plug system driver. The hot-plug system driver then uses hot-plug controller 124 to power up the slot, connect the slot to PCI bus 110 using the appropriate hot-plug switch (slot-specific reset pins are independently controlled), and deassert the reset signal (RST#) on the slot. The hot-plug service thereafter notifies the operating system that the new adapter card is installed, so the operating system can initialize the adapter and prepare to use it (the user may also be notified that the card is ready with a message on the display monitor).

The present invention avoids the problem noted in the Background, of an adapter excessively delaying its response to the deactivation of the reset signal such that a reboot is required. A predetermined time ($T_x$) is established for the period of time from deactivation of RST# to the first configuration access attempted by processor 102, to allow an adapter's internal bus logic to be initialized (for example, one or two seconds). In order to reduce the likelihood that system 100 will consider the adapter as being not present or defective, the card is designed to handle configuration accesses, normally without RETRY responses, after this time period $T_x$ has passed. In other words, the card conforms to the specification of being able to respond with a non-retry status message (or acknowledgement) within this time period. An occasional RETRY response is acceptable, provided it adheres to initial latency requirements of, e.g., 16 clock cycles. The adapter hardware and/or software are implemented to meet $T_x$. An adapter constructed in accordance with the present invention is further preferably capable of responding to normal (non-configuration) cycles following configuration completion, i.e., immediately following the configuration space setup and the enablement of the adapter's address spaces (again normally without a RETRY response, and with any such response adhering to the initial latency requirements).

For more complicated adapter cards which may require lengthy internal initialization, one solution for complying with the $T_x$ requirement is to move the functions that would cause long internal initialization times out of the initialization routine, and into to another operation, such as a built-in self-test (BIST) operation. Those functions can thereby be initiated during a later "diagnostic" operation via the BIST rather than as part of the initialization operation (that is, immediately following a reset).

For those very complex peripheral devices which still might not otherwise respond to normal cycles with something other than a long series of RETRY responses or wait states, an alternate solution is to implement an adapter driver which prevents normal (non-configuration) access to the adapter until the adapter is prepared to respond to the accesses. A bit in the adapter configuration space may be defined to allow configuration software or a device driver to check this bit to determine if the adapter (by setting that bit) has indicated that it is ready to respond to normal cycles.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the invention is applicable to similar reset responses, such as those generated by PCI power management services. It is therefore contemplated that such modifications can be made without departing from the spirit or scope of the present invention as defined in the appended claims.

We claim:

1. A method of registering a peripheral device with a computer, comprising the steps of:

isolating a slot, which is adapted to receive the peripheral device, from a bus of the computer;

inserting the peripheral device into the slot;

connecting the slot to the bus, after said inserting step;

deasserting a reset signal on the slot, after said inserting step;

responding with a status message from the peripheral device to the bus in response to an access attempt, within a predetermined time period established by the computer; and initializing the peripheral device with an operating system of the computer in response to said responding step.

2. The method of claim 1 wherein the status message is a retry response, and said responding step occurs during an initial latency period which is less than the predetermined time period.

3. The method of claim 1 further comprising the step of the peripheral device responding to non-configuration cycles immediately following configuration completion.

4. The method of claim 3 wherein said step of responding to non-configuration cycles includes the step of transmitting a retry response during an initial latency period which is less than the predetermined time period.

5. The method of claim 1 further comprising the step of initializing internal logic of the peripheral device, after said responding step.

6. The method of claim 5 wherein said step of initializing the internal logic of the peripheral device includes the step of performing a diagnostic operation.

7. The method of claim 1 further comprising the step of a driver preventing non-configuration access to the peripheral device until the peripheral device is ready to respond to such non-configuration access.

8. The method of claim 7 wherein said preventing step includes the step of setting a bit in a configuration space of the peripheral device to indicate that the peripheral device is ready.

9. The method of claim 7 wherein said preventing step includes the step of setting a bit in a configuration space of the operating system of the computer to indicate that the peripheral device is ready.

10. The method of claim 9 further comprising the step of the operating system determining that the bit has been defined in the configuration space.

11. A computer system comprising:

a memory device;

processor means for carrying out program instructions stored in said memory device;

a peripheral device;

means for connecting said peripheral device to said processor means; and means for responding with a status message from said peripheral device within a predetermined time period from a deasserting of a reset signal applied to said peripheral device and in response to an attempt to access said peripheral device.

12. The computer system of claim 11 further comprising means for deasserting the reset signal in response to a notification that said peripheral device has been attached to said connecting means.

13. The computer system of claim 11 wherein said processor means has a system bus, and said connecting means includes a local bus.

14. The computer system of claim 11 wherein said connecting means includes a slot adapted to receive said peripheral device.

15. The computer system of claim 11 wherein the status message is a retry response, and said responding means transmits the retry response during an initial latency period which is less than the predetermined time period.

16. The computer system of claim 11 wherein said peripheral device includes means for responding to non-configuration accesses from said processor means immediately following a configuration completion.

17. The computer system of claim 11 wherein said peripheral device includes means for initializing internal logic of said peripheral device after said transmitting of the status message.

18. The computer system of claim 11 further comprising means for preventing non-configuration access to said peripheral device until said peripheral device is ready to respond to such non-configuration access.

19. The computer system of claim 18 wherein said preventing means sets a bit in a configuration space to indicate that said peripheral device is ready.

* * * * *